(12) United States Patent
Wu

(10) Patent No.: US 6,668,859 B1
(45) Date of Patent: Dec. 30, 2003

(54) HYDRAULIC COLLET ASSEMBLY WITH A VALVE UNIT

(76) Inventor: Hsuan-Lung Wu, No. 4-6, Le-Tien Lane, Feng-Shu Li, Nan-Tun Dist., Taichung City (TW)

( * ) Notice: Subject to any disclaimer, the term of this patent is extended or adjusted under 35 U.S.C. 154(b) by 0 days.

(21) Appl. No.: 10/277,635

(22) Filed: Oct. 21, 2002

(51) Int. Cl.[7] .......................... F16L 27/00; F16L 49/00
(52) U.S. Cl. ...................................... 137/580; 137/340
(58) Field of Search ............................ 137/580, 340; 91/29, 31

(56) References Cited

U.S. PATENT DOCUMENTS

| | | | | |
|---|---|---|---|---|
| 2,310,309 A | * | 2/1943 | Orr | 137/580 |
| 3,020,057 A | * | 2/1962 | Gamet | 137/580 |
| 3,922,952 A | * | 12/1975 | Roddy et al. | 91/29 |
| 3,923,133 A | * | 12/1975 | Chivari | 137/580 |
| 4,040,338 A | * | 8/1977 | Wilson et al. | 137/580 |
| 4,168,654 A | * | 9/1979 | Wilson et al. | 137/580 |

* cited by examiner

Primary Examiner—A. Michael Chambers
(74) Attorney, Agent, or Firm—Marger Johnson & McCollom, PC

(57) ABSTRACT

A collet assembly includes a collet and a tubular valve sleeve sleeved on a rotary shaft that is disposed within a stationary wall body and which defines a piston-receiving chamber. A piston is disposed movably in the piston-receiving chamber. The valve sleeve is formed with a valve opening therein, a valve chamber extending from the valve opening, a valve inlet in fluid communication with the valve chamber and a fluid injection passage in the stationary wall body, and a valve outlet in fluid communication with the valve chamber and a fluid channel in the shaft. A check valve is mounted in the valve chamber, and is moved to an open position, in which, the valve opening is opened due to injection of a high-pressure hydraulic oil into a clearance through the fluid injection passage, thereby permitting movement of the piston, which, in turn, results in clamping of the collet.

4 Claims, 4 Drawing Sheets

HYDRAULIC COLLET ASSEMBLY WITH A VALVE UNIT

BACKGROUND OF THE INVENTION

1. Field of the Invention

The invention relates to a hydraulic collet assembly, more particularly to a hydraulic collet assembly with a valve unit for relief of pressure in a fluid injection passage in the hydraulic collet assembly.

2. Description of the Related Art

Referring to FIG. 1, a conventional hydraulic collet assembly is shown to include a machine body 31, a stationary wall body 32 disposed in the machine body 31 and formed with a fluid injection passage 321, a rotary shaft 33 disposed coaxially through the stationary wall body 32 and cooperating with the stationary wall body 32 to define a clearance 300 therebetween, a bearing unit 331 disposed between the stationary wall body 32 and the rotary shaft 33 to facilitate rotation of the rotary shaft 33 relative to the stationary wall body 32, a tubular slidable seat 35 disposed in and cooperating with the rotary shaft 33 to define a piston-receiving chamber therebetween, a piston 34 disposed movably within the piston-receiving chamber and cooperating with the rotary shaft 33 to define a gap 34G therebetween, and a collet 36 disposed in the tubular slidable seat 35 and coupled to the piston 34 for synchronous movement therewith.

The rotary shaft 33 is formed with a fluid channel 332 in fluid communication with the fluid injection passage 321 in the stationary wall body 32 and extending to and in spatial communication with the piston-receiving chamber. The collet 36 has clamping jaws confining an open mouth. When high-pressure hydraulic oil is injected into the gap 34G through the fluid injection passage 321 and the fluid channel 332, the collet 36 moves together with the piston 34 toward the fluid channel 332 in such a manner that the open mouth in the collet 36 is reduced in cross-section so as to clamp a rod-shaped workpiece (not shown) therein.

Some disadvantages that result from the use of the aforesaid conventional hydraulic collet assembly are as follows:

During the clamping operation of the workpiece in the collet 36, the high pressure oil is introduced into the bearing unit 331 through the clearance 300 formed between the rotary shaft 33 and the stationary wall body 32. Since the fluid injection passage 321 and the fluid channel 332 have to be kept under a high pressure state so as to maintain the collet 36 in the clamping state, the pressure of the hydraulic oil accumulated in the clearance 300 is relatively high. As such, friction force between the stationary wall body 32 and the rotary shaft 33 is relatively large during rotation of the rotary shaft 33, which may result in an undesirable increase in the temperature of the bearing unit 331 and the collet 35, and a reduction in the viscosity of the hydraulic oil in the bearing unit 331, thereby shortening the service life of the components of the conventional hydraulic collet assembly.

SUMMARY OF THE INVENTION

Therefore, the object of this invention is to provide a hydraulic collet assembly with a valve unit for relief of pressure in a fluid injection passage so as to prolong the service life of the components of the assembly.

Accordingly, a hydraulic collet assembly of the present invention includes: a machine body; an annular stationary wall body disposed in the machine body and formed with a fluid injection passage therein; a hollow rotary shaft co-axially extending through the stationary wall body, defining a piston-receiving chamber, and formed with a fluid channel extending to and in spatial communication with the piston-receiving chamber; and an annular piston movably received in the piston-receiving chamber in the rotary shaft in such a manner that the piston moves away from the fluid injection passage upon injection of a high pressure hydraulic oil into the piston-receiving chamber through the fluid injection passage and the fluid channel. The piston defines a collet-receiving chamber therein. A collet is movably received in the collet-receiving chamber, and is coupled to the piston for synchronous movement therewith. The collet has clamping jaws confining an open mouth that is reduced in cross-section when the piston moves away from the fluid channel. A bearing unit is disposed between the stationary wall body and the rotary shaft. A valve unit is disposed between the stationary wall body and the rotary shaft, and includes a tubular valve sleeve sleeved on the rotary shaft. The valve sleeve includes an annular wall body formed with a valve opening therein, a valve chamber extending from the valve opening, a valve inlet in fluid communication with the fluid injection passage and the valve opening, and a valve outlet in fluid communication with the valve chamber and the fluid channel. The valve unit further includes a check valve movably mounted in the valve chamber and operable to move between an open position, in which the valve opening is opened, thereby permitting fluid communication between the fluid injection passage and the fluid channel through the valve inlet and outlet, and a closed position, in which, the valve opening is closed by the check valve, thereby preventing fluid communication between the fluid injection passage and the fluid channel.

BRIEF DESCRIPTION OF THE DRAWINGS

Other features and advantages of this invention will become more apparent in the following detailed description of preferred embodiments of this invention, with reference to the accompanying drawings, in which.

DETAILED DESCRIPTION OF THE PREFERRED EMBODIMENT

Figure 1:
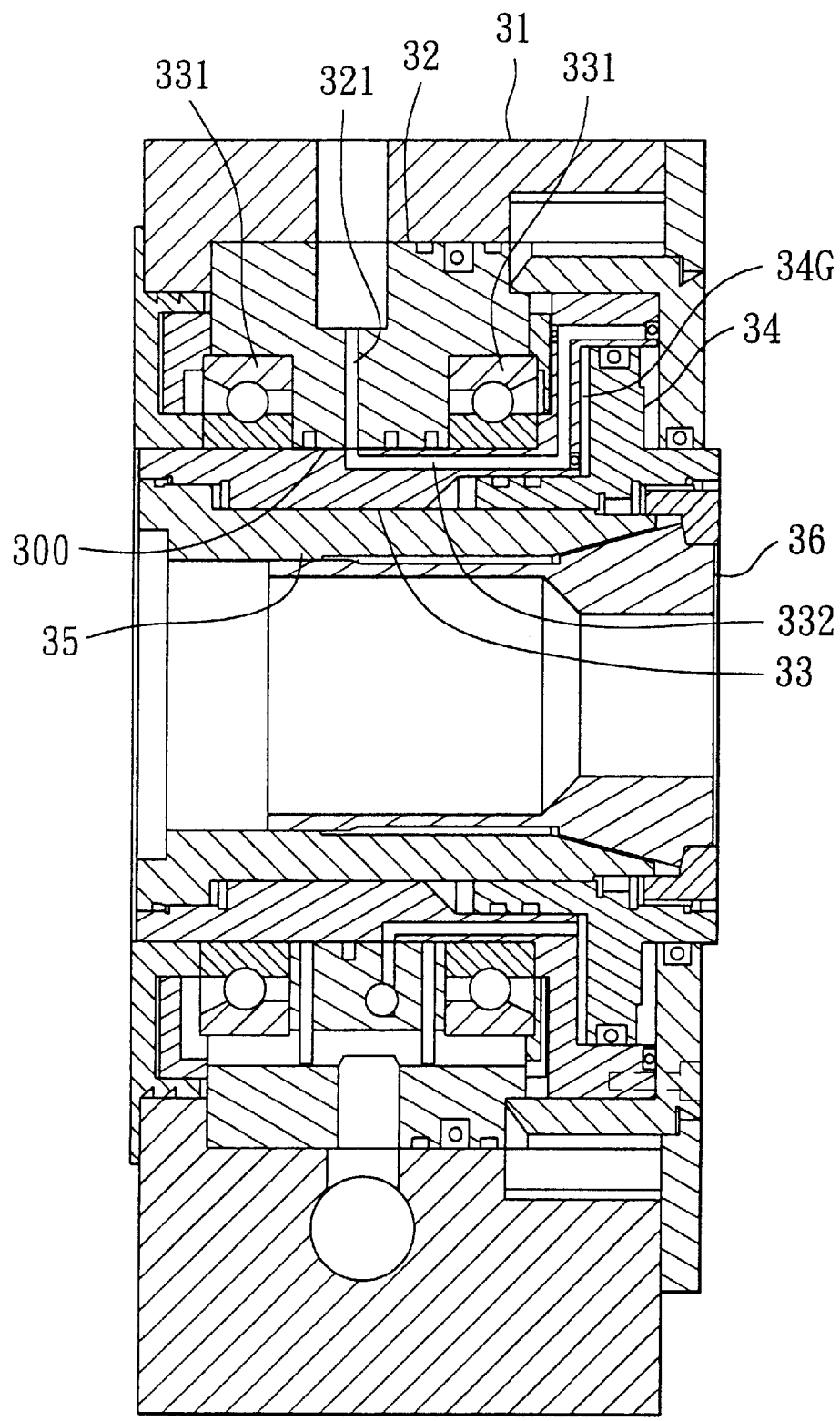
FIG. 1 is a sectional view of a conventional hydraulic collet assembly.
Figure 2:
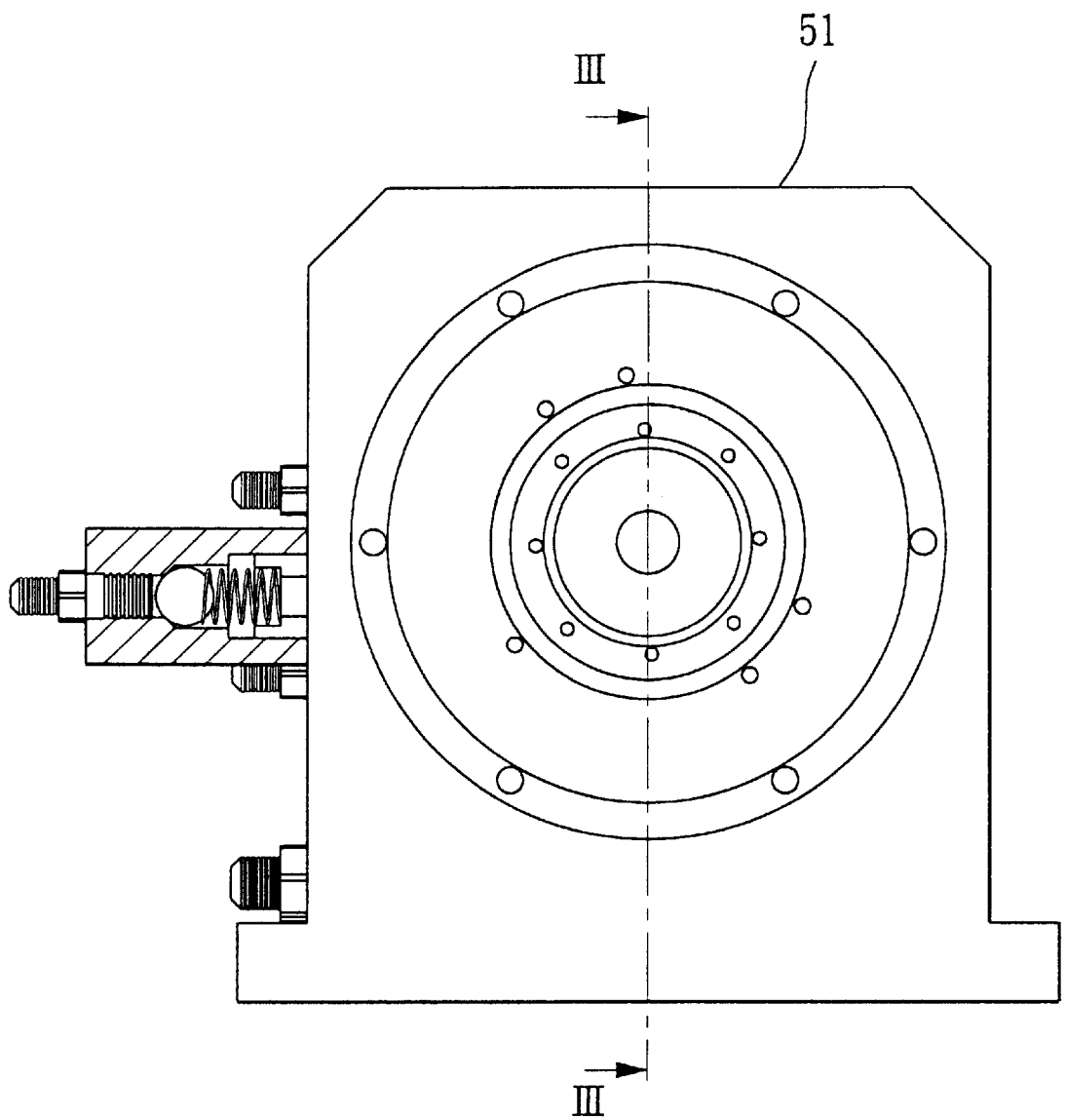
FIG. 2 is a schematic front view of a preferred embodiment of a hydraulic collet assembly according to the present invention.
Figure 3:
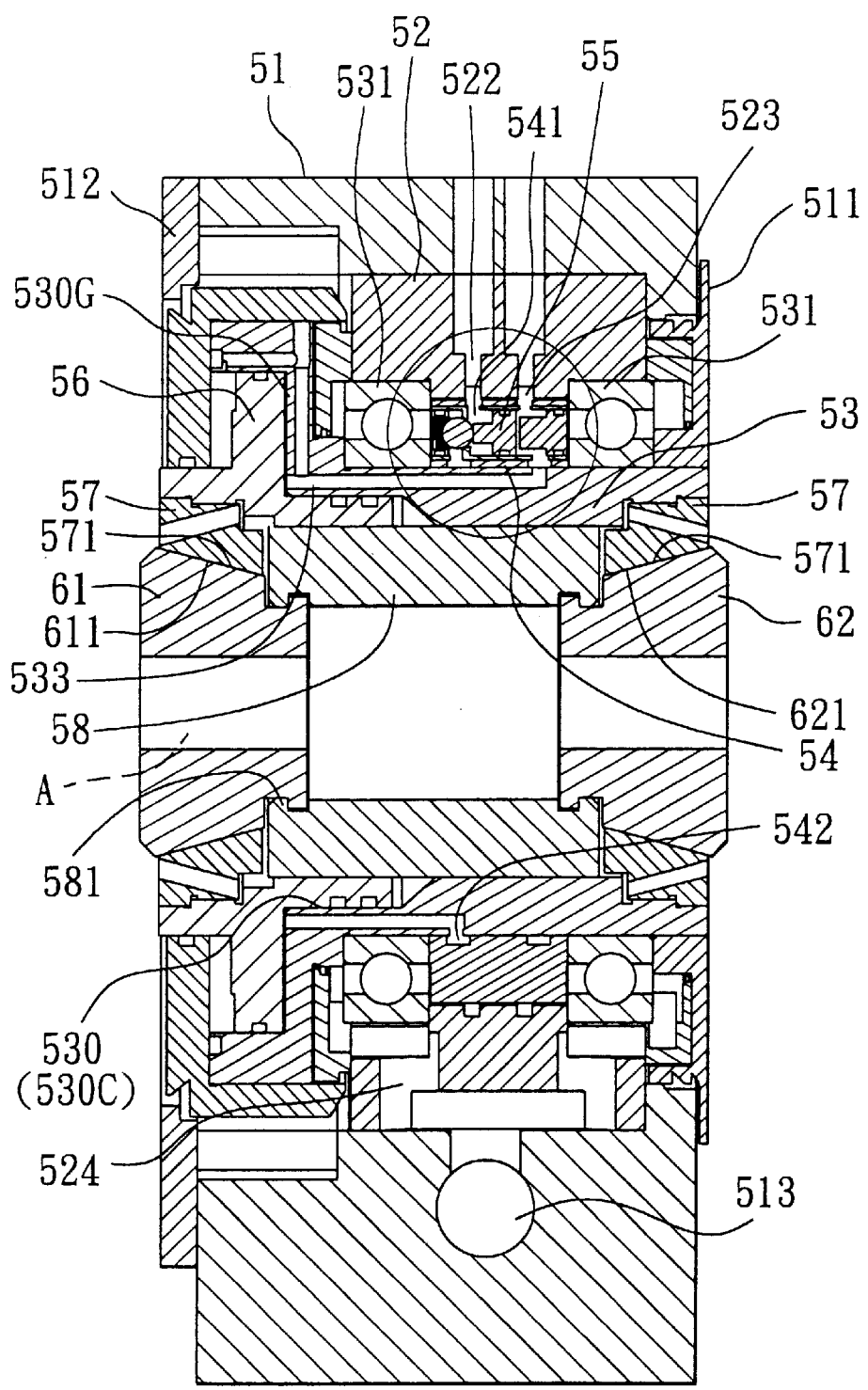
FIG. 3 is a sectional view of the preferred embodiment taken along line III—III in FIG. 2.
Figure 4:
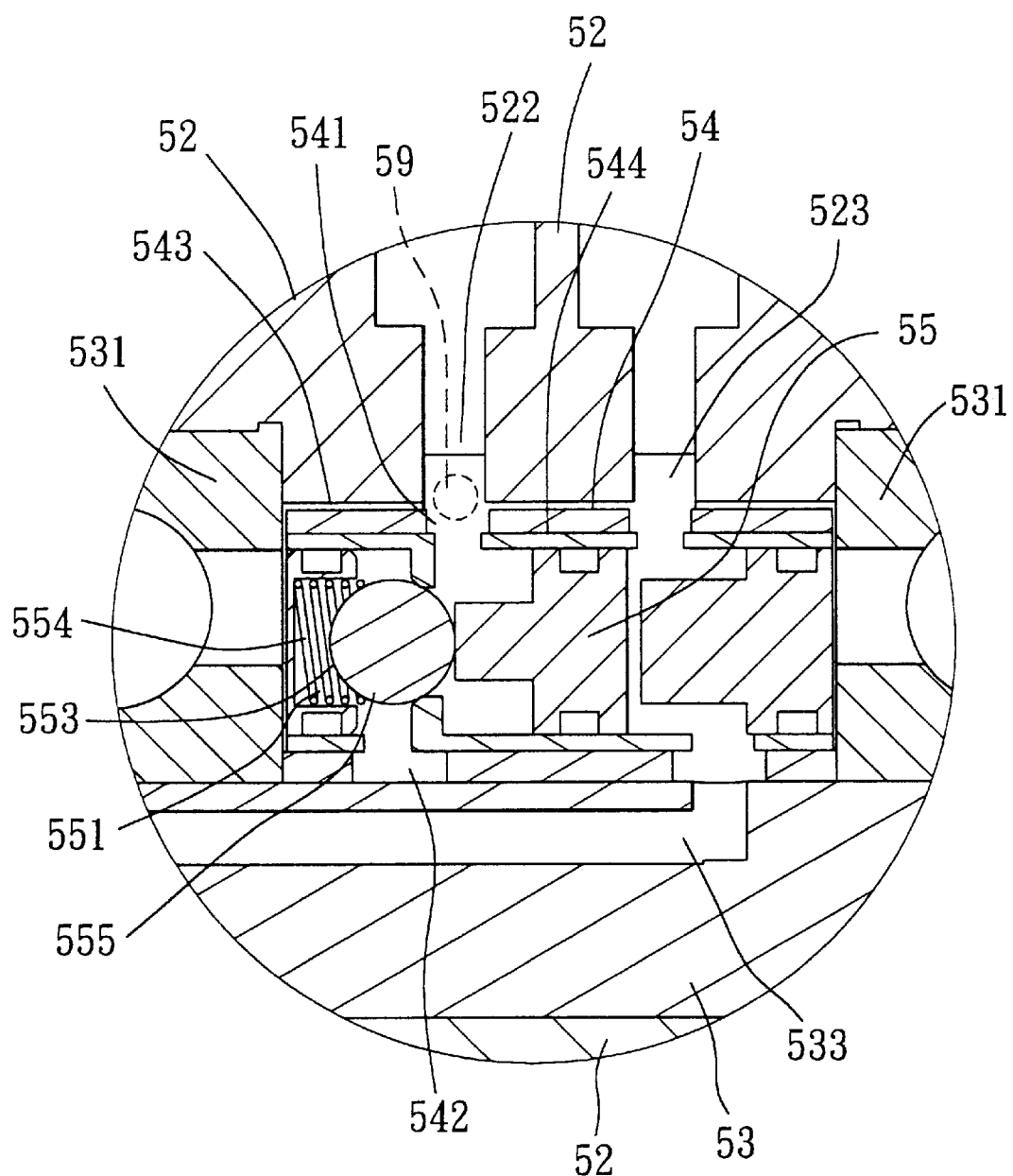
FIG. 4 is an enlarged view of an encircled portion of FIG. 3.

Referring to FIGS. 2 to 4, the preferred embodiment of a hydraulic collet assembly according to the present invention is shown to include a machine body 51, an annular stationary wall body 52, a hollow rotary shaft 53, an annular piston 56, a first collet 61, a bearing unit 531, and a valve unit 55.

As illustrated, the machine body 51 has opposite front and rear ends 511, 512.

The stationary wall body 52 is disposed in the machine body 51 adjacent to the front end 511 thereof, and is formed with a fluid injection passage 522 and a fluid outlet passage 523.

The rotary shaft 53 co-axially extends through the stationary wall body 52, and has a large-diameter rear portion 530 defining a piston-receiving chamber 530C therein. The rotary shaft 53 is further formed with a fluid channel 533 extending to and in spatial communication with the piston-receiving chamber 530C.

The piston 56 is movably received in the piston-receiving chamber 530C in the rotary shaft 53 in such a manner that the piston 56 moves away from the fluid channel 533 upon injection of high pressure hydraulic oil into the piston-receiving chamber 530C through the fluid injection passage 522 and the fluid channel 533. The piston 56 defines a first collet-receiving chamber 571.

The first collet 61 is movably received in the first collet-receiving chamber 571, and is coupled to the piston 56 for synchronous movement therewith. The first collet 61 has clamping jaws confining an open mouth that is reduced in cross-section so as to clamp a rod-shaped work piece (A) when the piston 56 is moved away from the fluid channel 533. Movement of the piston 56 toward the fluid channel 533 results in widening of the open mouth in the first collet 61, which, in turn, results in release of the work piece (A) from the first collet 61.

The bearing unit 531, which preferably includes two bearings, is disposed between the stationary wall body 52 and the rotary shaft 53 to facilitate rotation of the rotary shaft 53 relative to the stationary wall body 52.

The valve unit 55 is disposed between the stationary wall body 52 and the rotary shaft 53, and between the bearings of the bearing unit 531, and includes a tubular valve sleeve 54 and a check valve 555. The tubular valve sleeve 54 is sleeved on the rotary shaft 53, and includes an annular wall body 544 formed with a valve opening 553 therein, a valve chamber 551 extending from the valve opening 553, a valve inlet 541 in fluid communication with the fluid injection passage 522 and the valve opening 553, and a valve outlet 542 in fluid communication with the valve chamber 551 and the fluid channel 533. The check valve 555 is movably mounted in the valve chamber 551, and is operable to move between an open position, in which, the valve opening 553 is opened (when the high pressure hydraulic oil is injected into the fluid injection passage 522), thereby permitting fluid communication between the fluid injection passage 522 and the fluid channel 533 through the valve inlet and outlet 541, 542, and a closed position, in which, the valve opening 553 is closed by the check valve 555 (when the pressure in the fluid injection passage 522 is relieved) thereby preventing fluid communication between the fluid injection passage 522 and the fluid channel 533.

In this preferred embodiment, the check valve 555 includes a spring-biased ball 554 for controlling opening and closing of the valve opening 553. The spring-biased ball 554 is pushed to move away from the valve opening 553 when the high pressure hydraulic oil is injected into the fluid injection passage 522, and is urged to move toward the valve opening 553 when the pressure in the fluid injection passage 522 is relieved. Preferably, the machine body 51 is formed with a fluid collecting chamber 513 therein. The stationary wall body 52 is further formed with a fluid canal 524 in fluid communication with the fluid collecting chamber 513 in the machine body 51. The annular wall body 544 of the tubular valve sleeve 54 cooperates with the stationary wall body 52 to define therebetween an annular clearance 543 that is in fluid communication with the fluid collecting chamber 513 through the bearing unit 531 and the fluid canal 524 and that is in fluid communication with the fluid injection passage 522 such that the pressure in the fluid injection passage 522 is relieved by discharging the hydraulic oil from the fluid injection passage 522 into the fluid collecting chamber 513 through the clearance 543, the bearing unit 531 and the fluid channel 524 upon closing of the valve opening 553 and rotation of the rotary shaft 53 after injection of the high pressure hydraulic oil into the fluid injection passage 522 is stopped. A printed control circuit (not shown) is used to control injection of the hydraulic oil into the fluid injection passage 522. Since the feature of the present invention does not reside in the structure of the control circuit, a detailed description of the same is omitted herein for the sake of brevity. Preferably, a cooling means (not shown) with an outlet 50 is disposed in fluid communication with the fluid injection passage 522 to feed a coolant therein to when the work piece (A) is being machined so as to maintain the viscosity of the hydraulic oil in an optimum.

The rotary shaft 53 further defines a second collet-receiving chamber 571 opposite to the piston-receiving chamber 530C. The preferred embodiment further includes a second collet 62 movably received in the second collet-receiving chamber 571, front and rear shaft-retention caps 57 sleeved respectively around the first and second collets 61, 62, and a connecting rod 58 extending between and interconnecting the first and second collets 61, 62 by means of two hook units 581. The rear shaft-retention cap 57 is fastened threadedly to the piston 56 for synchronous movement therewith, and has a camming face in slidable contact with an inclined face 611 of the first collet 61. The front shaft-retention cap 57 has a camming face in slidable contact with an inclined face 621 of the second collet 62 such that movement of the piston 56 away from the fluid channel 533 results in concurrent actuation of the collets 61, 62 through the front and rear shaft-retention caps 57 so as to clamp the work piece (A) between the first and second collets 61, 62.

Since the pressure of the hydraulic oil in the fluid injection passage 522 is relieved after the clamping of the work piece (A) by the first and second collets 61, 62, the problem associated with hight hydraulic oil pressure in the clearance between the stationary. wall body 52 and the rotary shaft 53 as encountered in the prior art can be eliminated.

With this invention thus explained, it is apparent that numerous modifications and variations can be made without departing from the scope and spirit of this invention. It is therefore intended that this invention be limited only as indicated in the appended claims.

I claim:

1. A hydraulic collet assembly comprising:

a machine body;

an annular stationary wall body disposed in said machine body and formed with a fluid injection passage therein;

a hollow rotary shaft Co.-axially extending through said stationary wall body, defining a piston-receiving chamber, and formed with a fluid channel extending to and in spatial communication with said piston-receiving chamber;

an annular piston movably received in said piston-receiving chamber in said rotary shaft in such a manner that said piston moves away from said fluid injection passage upon injection of a high pressure hydraulic oil into said piston-receiving chamber through said fluid channel and said fluid injection passage, said annular piston defining a first collet-receiving chamber;

a first collet movably received in said first collet-receiving chamber, coupled to said piston, and having clamping jaws confining an open mouth that is reduced in cross-section when said piston is moved away from said fluid channel;

a bearing unit disposed between said stationary wall body and said rotary shaft; and a valve unit disposed between said stationary wall body and said rotary shaft, and including a tubular valve sleeve sleeved on said rotary shaft, said valve sleeve including an annular wall body formed with a valve opening therein, a valve chamber extending from said valve opening, a valve inlet in fluid communication with said fluid injection passage and said valve opening, and a valve outlet in fluid communication with said valve chamber and said fluid channel, said valve unit further including a check valve movably mounted in said valve chamber and operable to move between an open position, in which, said valve opening is opened, thereby permitting fluid communication between said fluid injection passage and said fluid channel through said valve inlet and outlet, and a closed position, in which, said valve opening is closed by said check valve, thereby preventing fluid communication between said fluid injection passage and said fluid channel.

2. The hydraulic collet assembly as defined in claim 1, wherein said check valve includes a spring-biased ball for controlling opening and closing of said valve opening.

3. The hydraulic collet assembly as defined in claim 1, wherein said machine body is formed with a fluid collecting chamber therein, said stationary wall body being further formed with a fluid canal in fluid communication with said bearing unit and said fluid collecting chamber, said annular wall body of said tubular valve sleeve cooperating with said stationary wall body to define therebetween an annular clearance that is in fluid communication with said fluid collecting chamber through said bearing unit and said fluid canal and that is in fluid communication with said fluid injection passage such that the pressure in said fluid injection passage is relieved by discharging the high pressure hydraulic oil from said fluid injection passage into said fluid collecting chamber through said clearance, said bearing unit and said fluid canal upon closing of said valve opening and rotation of said rotary shaft after injection of the high pressure hydraulic oil into said fluid injection passage is stopped.

4. The hydraulic collet assembly as defined in claim 1, wherein said rotary shaft defines a second collet-receiving chamber opposite to said piston-receiving chamber, said hydraulic collet unit further comprising a second collet movably received in said second collet-receiving chamber, a rear shaft-retention cap sleeved around said first collet and fastened to said piston for synchronous movement therewith, a front shaft-retention cap sleeved around said second collet, and a connecting rod extending between and interconnecting said first and second collets such that movement of said piston away from said fluid channel results in concurrent actuation of said first and second collets through said front and rear shaft-retention caps.

* * * * *